Jan. 11, 1927.

C. ILLG 1,614,243

TAILOR'S CUTTING KNIFE

Filed July 13, 1925

INVENTOR
Carl Illg
BY
ATTORNEY

Patented Jan. 11, 1927.

1,614,243

UNITED STATES PATENT OFFICE.

CARL ILLG, OF BROOKLYN, NEW YORK.

TAILOR'S CUTTING KNIFE.

Application filed July 13, 1925. Serial No. 43,070.

This invention relates to improvements in tailor's cutting knives, and it is the principal object of the invention to mount a knife, more particularly a safety-razor blade in a holder in such a manner that an extremely useful though simple and inexpensive knife is produced.

Another object of the invention is the provision of a bi-partite handle for the knife blade equipped with suitable means for holding both parts together with the knife blade projecting thereover.

A further object of the invention is the provision of a tailor's cutting knife provided with suitable projections adapted to fit into corresponding openings in the hilt for combining hilt and blade.

A still further object of the invention is the provision of a tailor's cutting knife provided with means for limiting the depth of a cut.

These and other objects and advantages of the invention will become more fully known as the description thereof proceeds, and will then be more specifically defined in the appended claim.

In the accompanying drawing forming a material part of this disclosure:

Figure 1:
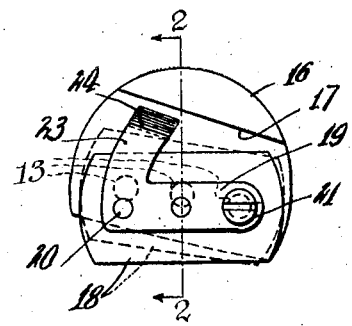
Fig. 1 is a front elevation of a tailor's cutting knife constructed according to the present invention.
Figure 2:
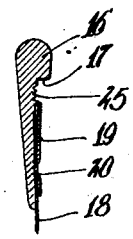
Fig. 2 is a section on line 2—2 of Figure 1.

The tailor's cutting knife consists of a bi-partite holder or hilt 16 of any suitable material having a shoulder 17 formed therewith adapted to be engaged by a knife blade 18, preferably a safety-razor blade of the Gillette type having three openings 13 therein and is held against said hilt by a plate member 19 having suitable warts 20 formed on one of its faces, adapted to engage the holes in the blade, while a screw 21 adapted to be passed through the hole 22 in the plate member 19 holds the parts securely assembled.

Figure 3:
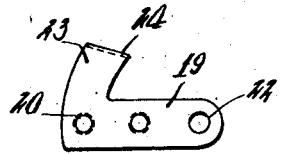
Fig. 3 is a rear elevation of a blade holder shown in Figures 1 and 2.
Figure 4:
Fig. 4 is an edge view thereof.

The member 19 has substantially the form illustrated in Figure 3 and its angularly disposed shank 23 is provided on one of its sides with an offset portion 24 for engaging the corrugations 25 of the hilt in order to limit the depth of the cut.

It is to be understood that such changes may be made in the general arrangement and in the construction of the minor details of the knife shown and described, as an example, of the practical embodiment of the invention, as fall within the scope of the appended claim without departure from the spirit of the invention.

Having thus described my invention, what I claim as new, and desire to secure by Letters Patent, is:

In a cutting device of the class described, the combination with a hilt portion, of a cutting blade having perforations therein, a clamping plate having a plurality of warts engaging the blade perforations, means for clamping the plate, cutting blade and hilt in position and means for adjusting the clamping plate to accommodate the blade for cuts of different depths, said last-mentioned means including a series of corrugations formed on the hilt portion and an offset portion integral with the clamping plate for engaging any one of said series of corrugations depending on the depth of cut.

In testimony whereof I have affixed my signature.

CARL ILLG.